United States Patent
Nickerson

(10) Patent No.: US 12,027,679 B2
(45) Date of Patent: Jul. 2, 2024

(54) NETWORKED BATTERY MONITORING SYSTEMS, METHODS, AND APPARATUS

(71) Applicant: TL3T, LLC, West Valley, UT (US)

(72) Inventor: Alan Nickerson, West Valley, UT (US)

(73) Assignee: TL3T, LLC, West Valley, UT (US)

( * ) Notice: Subject to any disclaimer, the term of this patent is extended or adjusted under 35 U.S.C. 154(b) by 0 days.

(21) Appl. No.: 17/548,248

(22) Filed: Dec. 10, 2021

(65) Prior Publication Data

US 2022/0190399 A1    Jun. 16, 2022

Related U.S. Application Data

(60) Provisional application No. 63/208,421, filed on Jun. 8, 2021, provisional application No. 63/123,725, filed on Dec. 10, 2020.

(51) Int. Cl.
*H01M 10/48* (2006.01)
*H01M 10/42* (2006.01)

(52) U.S. Cl.
CPC ..... *H01M 10/482* (2013.01); *H01M 10/4257* (2013.01); *H01M 10/484* (2013.01); *H01M 10/486* (2013.01); *H01M 2010/4271* (2013.01); *H01M 2010/4278* (2013.01)

(58) Field of Classification Search
CPC .......... H01M 10/4257; H01M 10/482; H01M 10/484; H01M 10/486; H01M 2010/4271; H01M 2010/4278
See application file for complete search history.

(56) References Cited

U.S. PATENT DOCUMENTS

| | | | |
|---|---|---|---|
| 2005/0035740 A1* | 2/2005 | Elder | H01M 10/0413 320/116 |
| 2009/0102290 A1* | 4/2009 | Wolf | H02J 7/00309 307/80 |
| 2015/0028816 A1* | 1/2015 | Lee | H02J 13/00026 320/134 |
| 2020/0200834 A1* | 6/2020 | Uchino | G01R 31/382 |

(Continued)

FOREIGN PATENT DOCUMENTS

WO    WO-2012007596 A1 *    1/2012    ............... C25B 1/04

OTHER PUBLICATIONS

Machine translation WO2012007596A1 (Year: 2012).*

*Primary Examiner* — Victoria H Lynch
(74) *Attorney, Agent, or Firm* — TechLaw Ventures, PLLC; Bretton L. Crockett

(57) ABSTRACT

The present disclosure is directed systems and methods for monitoring battery conditions. In one illustrative embodiment, a system in accordance with the present disclosure may include a number of battery sensor units, each battery sensor unit being in operative communication with sensors on each individual cell on a battery, such as a battery used for supplying power to an industrial vehicle. The battery sensor units may track the supply voltage, temperature, and/or electrolyte level for each cell on a battery. One or more site gateways disposed at the location where the batteries are in use are in operative communication with the battery sensor units and through a network connection provide data collected by the battery sensor units to a database that can be accessed by remote users using an internet accessible portal or mobile app. The system may provide real time alerts for out of bound conditions.

20 Claims, 4 Drawing Sheets

(56) References Cited

U.S. PATENT DOCUMENTS

2021/0135269 A1\* 5/2021 Song ................ H01M 8/188
2023/0120239 A1\* 4/2023 Kasselman ........ H01M 10/441
                                                                                   320/118

\* cited by examiner

NETWORKED BATTERY MONITORING SYSTEMS, METHODS, AND APPARATUS

CROSS-REFERENCE TO RELATED APPLICATION

This application claims the benefit of U.S. Provisional Application No. 63/123,725, filed Dec. 10, 2020 and of U.S. Provisional Application No. 63/208,421, filed Jun. 8, 2021. The contents of each of these related applications is incorporated herein by reference in its entirety, including but not limited to those portions that specifically appear hereinafter.

TECHNICAL FIELD

This disclosure relates to systems, methods, and apparatus for the remote monitoring of batteries.

BACKGROUND

A battery monitoring system that can provide real time data from the individual cells of each battery that can be remotely monitored would be an improvement in the art. Such a system that allows individual cell data to be recorded and reported during both use and charging would be a further improvement in the art.

SUMMARY

The present disclosure is directed to systems and methods for monitoring battery conditions. In one illustrative embodiment, a system in accordance with the present disclosure may include a number of battery sensor units, each battery sensor unit being in operative communication with sensors on each individual cell on a battery, such as a battery used for supplying power to an industrial vehicle. The battery sensor units may track the supply voltage, temperature, and electrolyte/liquid level for each cell on a battery. One or more site gateways disposed at the location where the batteries are in use are in operative communication with the battery sensor units and through a network connection provide data collected by the battery sensor units to a database that can be accessed by remote users using an internet accessible portal or mobile app. The system may provide real time alerts for out of bound conditions to allow the prevention of dangerous conditions or maintenance to be indicated prior to potential breakdowns or other issues.

DESCRIPTION OF THE DRAWINGS

It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

DETAILED DESCRIPTION

Figure 1A:
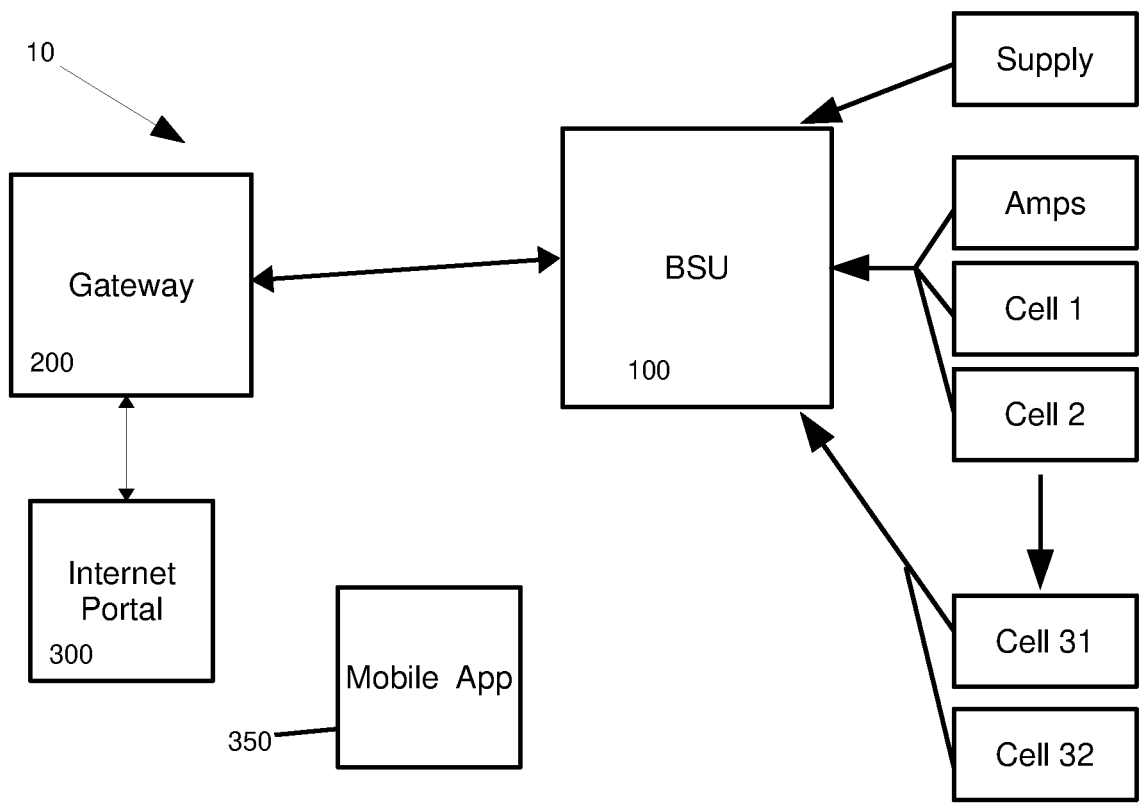
FIG. 1A is a block diagram providing an overview of a first illustrative system in accordance with the principles of the present disclosure.

The present disclosure relates to apparatus, systems and methods for computer implemented remote monitoring of battery conditions. It will be appreciated by those skilled in the art that the embodiments herein described, while illustrative, are not intended to so limit this disclosure or the scope of the appended claims. Those skilled in the art will also understand that various combinations or modifications of the embodiments presented herein can be made without departing from the scope of this disclosure. All such alternate embodiments are within the scope of the present disclosure.

In general, any of the disclosed methods and processes can take the form of instructions carried on a non-transitory storage medium and executable by, and/or at the direction of, one or more hardware processors and/or other computer hardware. Such non-transitory storage media and the processors or other hardware that execute the carried instructions are considered to be within the scope of this invention. As well, the disclosed processes may ascribe various functionalities to elements disclosed herein. However, such allocations of functionalities are presented only by way of example and, in other embodiments, those functionalities can be allocated differently. Thus, it should be understood that the scope of the invention is not limited to any particular allocation or performance of functions.

Turning to FIG. 1, an illustrative embodiment of a first system 10 in accordance with the present disclosure is depicted. As depicted, system 10 may include a number of battery sensor units 100 (although only a single one is depicted for illustration), and at least one site gateway 200 which is connected to the internet to allow communication with an internet portal 300 and/or a mobile application 350. For purposes of understanding, a system similar to that depicted in FIG. 1 will be discussed in connection with an installation at a job site, such as a warehouse to allow monitoring on electric equipment, such as forklifts or other electric vehicles that are in use at that location. It will be appreciated that such installation is merely illustrative, and the systems may be used at any suitable location where equipment benefiting from monitoring is in use.

The site gateway 200 may include a discrete computer or processor, such as a Raspberry Pi, or smaller processor capable of, and programmed to, perform the necessary functions. During operation, the site gateway 200 is in communication with the battery sensor units 100 at the location where the system components are disposed. In the depicted embodiment, a single site gateway 200 can communicate with up to 250 separate battery sensor units 100. Each unit may be one a separate vehicle or other battery using device.

Such communication may be conducting using a wireless protocol, such as radio, Bluetooth, Wi-Fi, and the like. The site gateway uses a network connection, such as ethernet, Wi-Fi, etc., that may include the internet to communicate with a computing object, such as a networked computer that functions as a server for controlling aspects of the methods and systems discussed herein, via a communications network which may include the internet. It will be appreciated that such a server will include processors, memory and software instructions that may be followed to perform the processes discussed herein. It will be further appreciated that a server as discussed herein is only representative and that in different embodiments, aspects and processing for the various methods may be distributed among multiple computing objects. In one illustrative embodiment, a system in accordance with the present disclosure may include software stored on a mobile computing device such as a smartphone or a tablet computer running an "app" 350 and databases for storing information that are remotely hosted on and/or accessed by the server connected to a network, such as the internet. In a typical embodiment, a user may contact a system in accordance with the present disclosure using a mobile computing device, such as a smartphone that is connected to a network, as by using a wireless data protocol over a wireless telephone data network or via WIFI, or by using a computer to access the internet portal 300 through a webpage style interface. In use, the database may be continuously updated to reflect the detected battery conditions. It will be appreciated that the particular number of databases may vary based on the system design and specific system application as will be discussed further herein. It will be further appreciated that some databases may be commercially available from third party sources and accessed by the systems and methods discussed herein.

In a typical installation, the site gateway 200 will be a fixed physical location, with a single battery sensor unit 100 on each battery powered unit (such as vehicle or forklift) which is individually monitoring each cell on each battery of the unit.

Each battery sensor unit 100, may include a discrete computer or processor, such as a Raspberry Pi, or smaller processor capable of, and programmed to, perform the necessary functions. Each battery sensor unit 100 may include hardware and associated software for communications, such as an ISM Radio to allow communications between the unit and the site gateway 200.

Figure 1B:
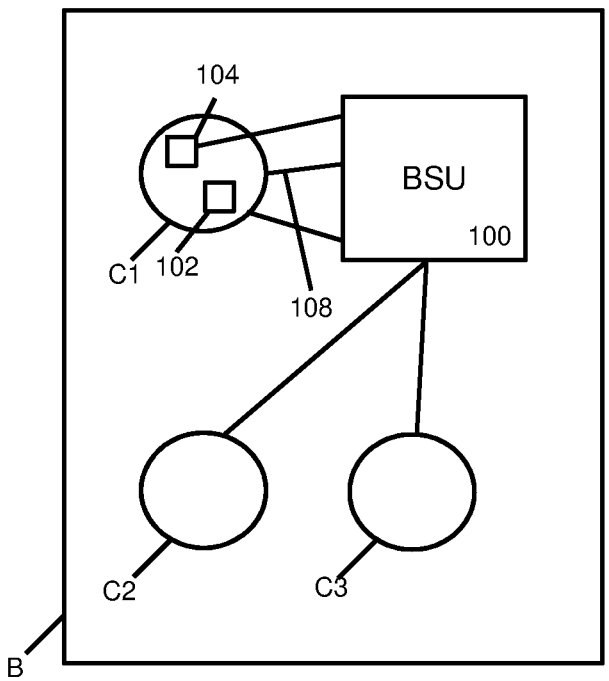
FIG. 1B is a block diagram illustrating the relation of the battery sensor unit as depicted in FIG. 1A, in position on the cells of a battery.

As shown in FIGS. 1A and 1B, each battery sensor unit 100 may be in communication with sensors on each individual cell on a battery, such as a battery used for supplying power to an industrial vehicle. In the depicted embodiment, the BSU may read sensors associated with each cell (such as cells C1, C2, and C3) on a battery B. Each reading may be taken on a separate channel read by the BSU, which receives a voltage reading. The reading may be accomplished by detecting a voltage either directly from the cell or from a sensor. In the depicted embodiment, one or more connecting wires may be used to connect to a cell or sensor. As shown in FIG. 1B, a battery sensor unit 100 may directly read a voltage from an individual battery cell C1, using a wire 108 that connects to the cell's positive terminal. In other embodiments a voltage meter may be used. A temperature probe 104, such as a thermistor that is sealed in a suitable package or coating to withstand the electrolyte solution present in a cell may be connected to the BSU 100. The provided voltage can be converted to temperature reading. Similarly, a water probe 102, such as a lead wire extending into the cell a desired distance to detect a first voltage when in contact with electrolyte solution and second when no longer in contact, can be used to sense the water level. As shown by cells C2 and C3, where desired, only a single aspect, such as voltage can be monitored.

In addition to tracking the temperature, electrolyte/liquid level, and supply voltage for individual cells, the system may be used to track some overall battery performance measures. For example, a Hall Effect sensor chip attached to a metal ring placed around the positive cable leading from the battery B can be used to monitor the amperage of the battery B. Similarly, a single temperature sensor at a central location, or other no-cell specific sensor can be placed.

In this manner, the battery sensor unit 100 can accurately track such data for each battery that is in use at a particular location, and for the desired characteristics of each cell on each battery. Thus, the individual cells on all batteries on a single vehicle (or other battery powered unit) can be tracked using the system 10. It will be appreciated that although only a single battery B is depicted, that the FIGS. are merely illustrative and any number of batteries having any number of cells may be monitored using the appropriate number of units.

It will be appreciated that by using sensors that provide data as voltage readings, that the raw data of the voltage detected at a particular time may be stored in the database. In the event that a particular lead were misidentified in the database (for example a temperature sensor coded as a voltage reading) then upon discovery, the saved raw data would be used to generate the appropriate values for the correct parameter to be tracked.

The system 10 may track the parameters of the cells continuously, including as a battery is charged, is drawn down during use and is at rest. The system may store the raw voltage data in the database and convert the voltage values, where appropriate, to temperature, electrolyte level, amperage, etc. for display to users accessing the system through the mobile app or the internet portal.

Figure 2:
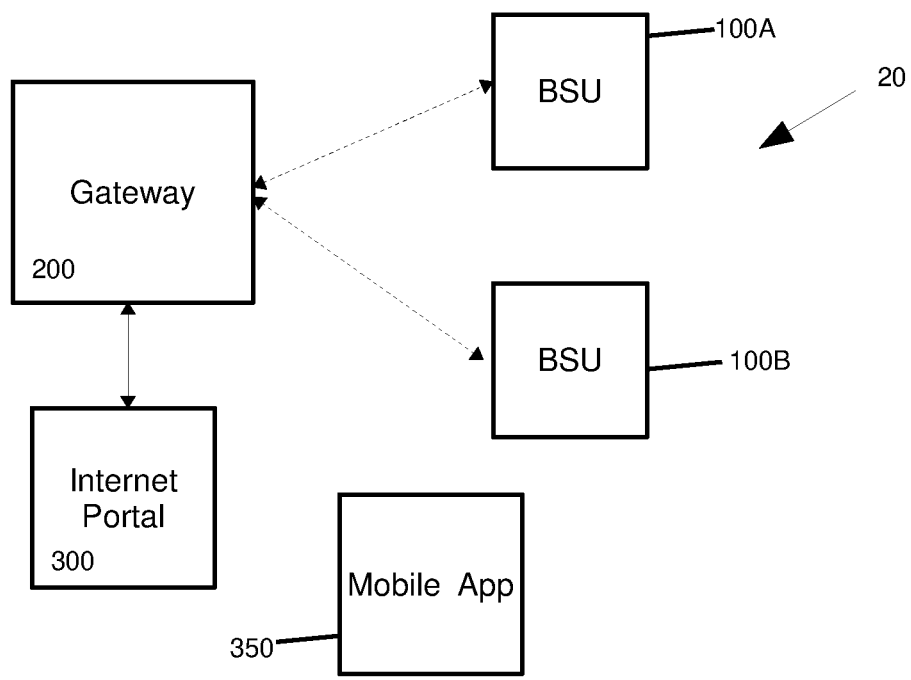
FIG. 2 is a block diagram providing an overview of a first illustrative system in accordance with the principles of the present disclosure.

Turning to FIG. 2, an illustrative embodiment of another system 20 in accordance with the present disclosure is depicted. As depicted, system 20 may include a number of battery sensor units 100A, 100B, et seq., at least one site gateway 200 which is connected to the internet to allow communication with an internet portal 300 and/or a mobile application 350. For purposes of understanding, a system similar to that depicted in FIG. 2 will be discussed in connection with an installation at a job site, such as a warehouse to allow monitoring on electric equipment, such as forklifts or other electric vehicles that are in use at that location. It will be appreciated that such installation is merely illustrative, and the systems may be used at any suitable location where equipment benefiting from monitoring is in use.

The site gateway 200 may include a discrete computer or processor, such as a Raspberry Pi, or smaller processor capable of, and programmed to, perform the necessary functions. During operation, the site gateway 200 is in communication with the battery sensor units 100A, 100B, et seq. at the location where the system components are disposed. Such communication may be conducting using a wireless protocol, such as radio, Bluetooth, Wi-Fi, and the like. The site gateway uses a network connection, such as ethernet, Wi-Fi, etc., that may include the internet to communicate with the internet portal 300, which may include a database that is continuously updated to reflect the detected battery conditions. Users may be able to access the portal through a webpage or hosted interface or a standalone app 350 on a mobile device. In a typical installation, the site gateway will be a fixed physical location, with a single battery sensor unit 100 on each battery powered unit (such as vehicle or forklift) which is in communication which enough sensors modules 1000 (FIG. 4A) to individually monitor each cell on each battery of the unit. The sensor modules may communicate with the battery sensor unites using a wired connection, such as a CANBus, and the battery sensor units communicate with the site gateway using a wireless radio style communications protocol.

Figure 3:
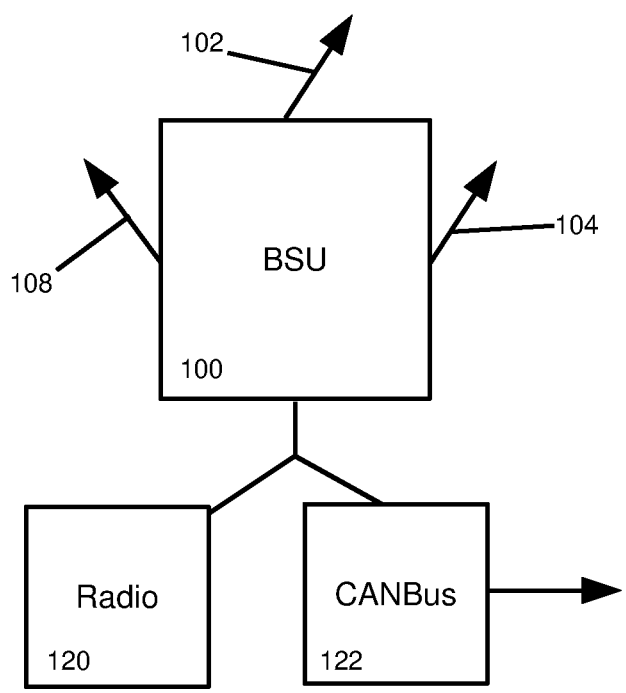
FIG. 3 is a block diagram illustrating a battery sensor unit of FIG. 2 in more detail.

Each battery sensor unit 100, may include a discrete computer or processor, such as a Raspberry Pi, or smaller processor capable of, and programmed to, perform the necessary functions. As shown in FIG. 3, each battery sensor unit 100 may be in communication with sensors on each individual cell on a battery, such as a battery used for supplying power to an industrial vehicle. As shown in FIG. 3B, a battery sensor unit 100 may read a temperature probe 104, water probe 102, and a voltage 108, on an individual battery cell C1 to track the temperature, electrolyte/liquid level, and/or supply voltage for that cell.

Additionally, each battery sensor unit 100 may include hardware and associated software for communications, such as the depicted ISM Radio 120 or CANBus 122 to allow communications between the unit, the site gateway 200, and one or more sensor modules 1000.

Figure 4A:
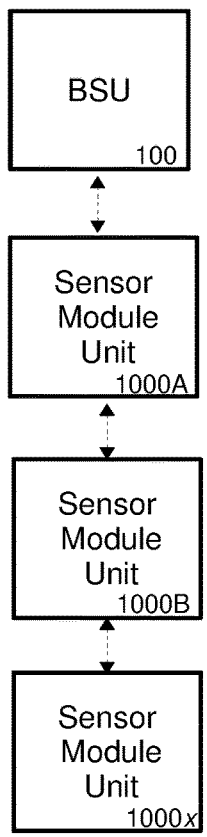
FIG. 4A is a block diagram illustrating the relation of a battery sensor unit of FIG. 2 and FIG. 3 to one or more sensor modules.
Figure 4B:
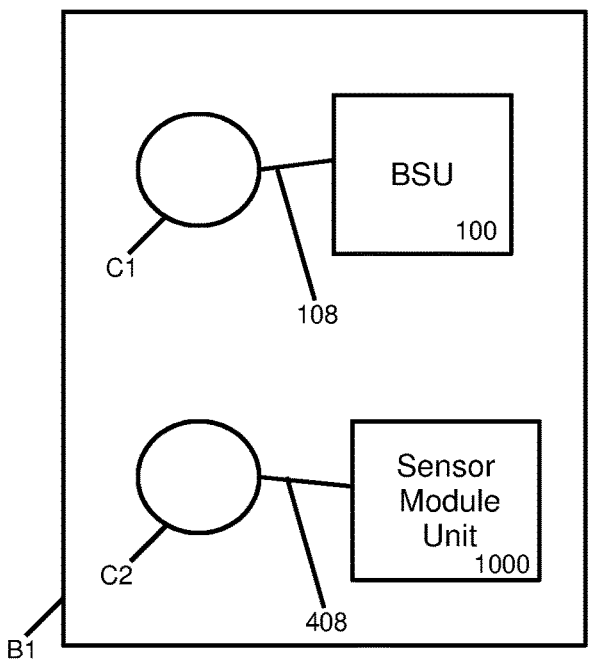
FIG. 4B is a block diagram illustrating the relation of a battery sensor unit and a sensor modules as depicted in FIG. 4A, in position on the cells of a battery.

As depicted in FIG. 4A, each battery sensor unit 100 of system 20 may be in communication with one or more sensor modules, 1000A, 1000B, et seq., each of which similarly may read a temperature probe, water probe, and/or a voltage, on an individual battery cell to track the temperature, electrolyte/liquid level, and supply voltage for that cell. FIG. 4B depicts a single lead being used to track the voltage on cells C1 and C2 by a battery sensing unit 100 and a sensor module 1000, respectively. In this manner, the battery sensor unit 100 can accurately track the desired data for each cell on each battery that is in use at a particular location. Thus, the individual cells on all batteries on a single vehicle (or other battery powered unit) can be tracked using the system, through a single battery sensor unit 100. It will be appreciated that although only a single battery B is depicted, that the FIGS. are merely illustrative and any number of batteries having any number of cells may be monitored using the appropriate number of units.

Figure 5:
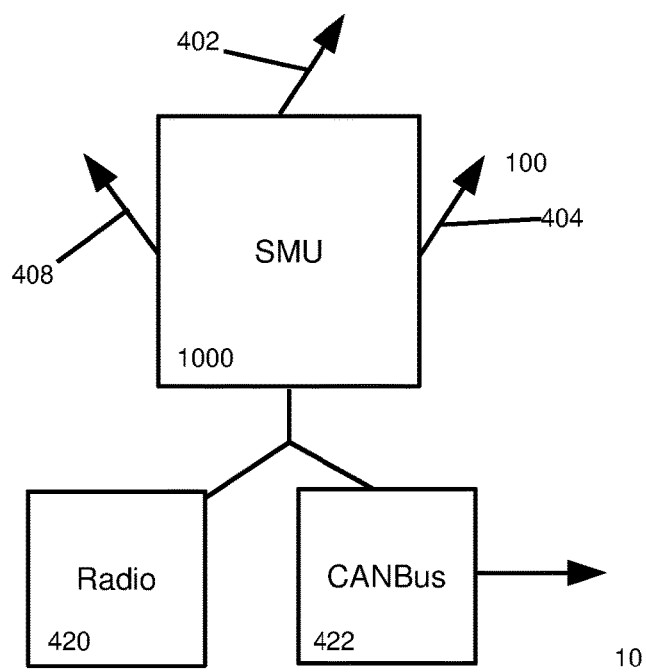
FIG. 5 is a block diagram illustrating a sensor module of FIG. 4A in more detail.

Turning to FIG. 5, similar to the battery sensor unit 100, each sensor module 1000 may be in communication with sensors on each individual cell on a battery (as depicted in FIG. 4B), such as a battery used for supplying power to an industrial vehicle, each module unit 1000 may read a temperature probe 404, water probe 402, and voltage meter 408, on an individual battery cell to track the temperature, electrolyte/liquid level, and supply voltage for that cell.

Additionally, each sensor module 1000 may include hardware and associated software for communications, such as the depicted ISM Radio 420 or CANBus 422 to allow communications between the module and the battery sensor unit 100.

Figure 6:
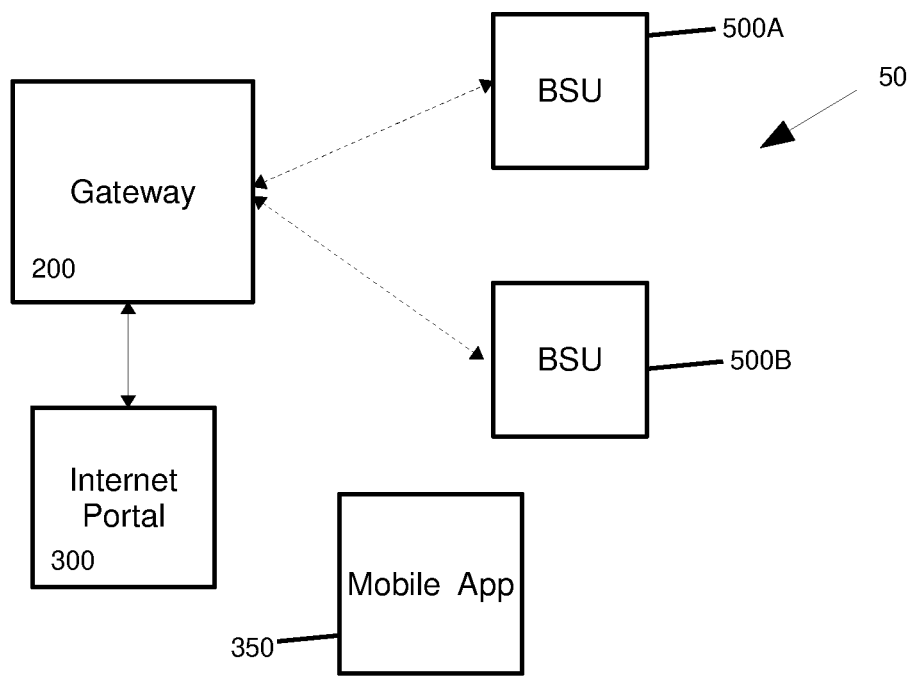
FIG. 6 is a block diagram providing an overview of another illustrative system in accordance with the principles of the present disclosure.

Turning to FIG. 6, an illustrative embodiment of another system 50 in accordance with the present disclosure is depicted. As depicted, system 50 may include a number of battery sensor units 500A, 500B, et seq., at least one site gateway 200 which is connected to the internet to allow communication with an internet portal 300 and/or a mobile application 350. For purposes of understanding, a system similar to that depicted in FIG. 6 will be discussed in connection with an installation at a job site, such as a warehouse to allow monitoring on electric equipment, such as forklifts or other electric vehicles that are in use at that location. It will be appreciated that such installation is merely illustrative, and the systems may be used at any suitable location where equipment benefiting from monitoring is in use.

As in the embodiments of FIGS. 1 and 2, the site gateway 200 may include a discrete computer or processor, such as a Raspberry Pi, or smaller processor capable of, and programmed to, perform the necessary functions. During operation, the site gateway 200 is in communication with the battery sensor units 500A, 500B, et seq. at the location where the system components are disposed. Such communication may be conducting using a wireless protocol, such as radio, Bluetooth, Wi-Fi, and the like. The site gateway uses a network connection, such as ethernet, Wi-Fi, etc., that may include the internet to communicate with the internet portal 300, which may include a database that is continuously updated to reflect the detected battery conditions. Users may be able to access the portal through a webpage or hosted interface or a standalone app 350 on a mobile device. In a typical installation, the site gateway will be a fixed physical location, with a single battery sensor unit 500 on each battery powered unit (such as vehicle or forklift) which used to individually monitor each cell on each battery of the unit.

Figure 7:
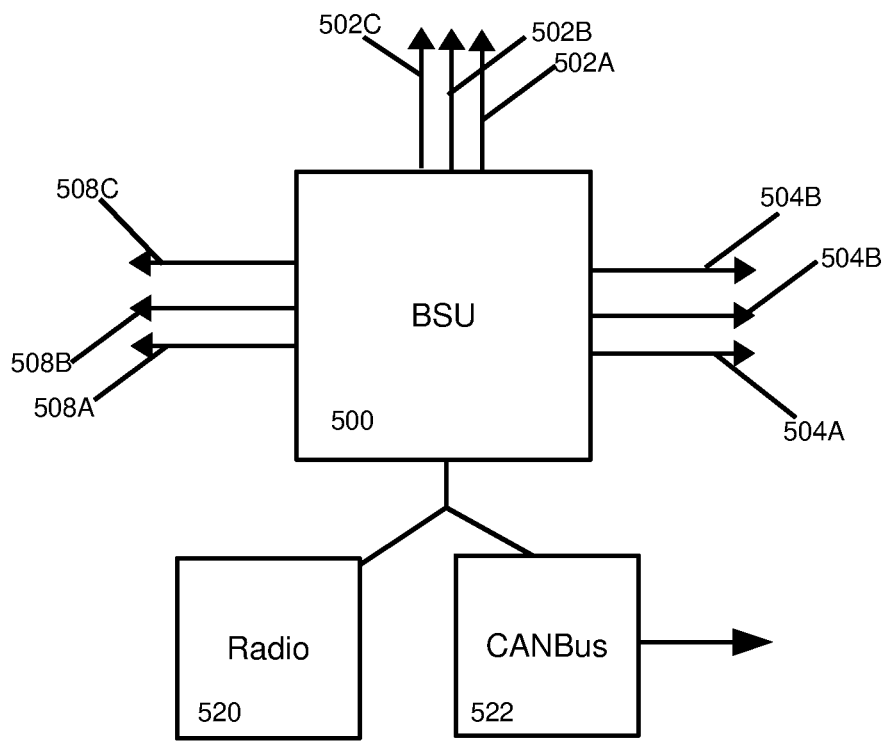
FIG. 7 is a block diagram illustrating a battery sensor unit of FIG. 6 in more detail.

Each battery sensor unit 500, may include a discrete computer or processor, such as a Raspberry Pi, or smaller processor capable of, and programmed to, perform the necessary functions. As shown in FIG. 7, each battery sensor unit 500 may read a series of suitable sensors, such as a temperature probes 504A, 504B. 504C, et seq., a series of water probes 502A, 502B. 502C, et seq., and a series of voltages directly from cells using lead wires 508A, 508B. 508C, et seq. In one embodiment, a single battery sensor unit 500 may have sufficient water probes 502A, 502B. 502C, et seq., and voltage meters 508A, 508B. 508C, et seq. such that one is associated with each individual battery cell on each battery on a battery powered unit, to track the electrolyte/liquid level and supply voltage for each individual cell. The battery sensor unit 500 may have a lesser number of temperature probes 504A, 504B. 504C, et seq. such that each battery on the battery powered unit may have a single temperature probe placed thereon, to monitor a medial temperature for all cells on the battery, or for a single cell near a battery midpoint. In another embodiment, a single battery sensor unit 500 may have sufficient water probes 502A, 502B. 502C, et seq., voltage leads 508A, 508B. 508C, et seq., and temperature probes 504A, 504B. 504C, et seq. such that one is associated with each individual battery cell on each battery on a battery powered unit, to track the electrolyte/liquid level, supply voltage, and temperature for each individual cell.

Additionally, each battery sensor unit 500 may include hardware and associated software for communications, such as the depicted ISM Radio 520 or CANBus 522 to allow communications between the unit, the site gateway 200, and one or more sensor modules 1000.

One or more site gateways disposed at the location where the batteries are in use are in operative communication with the battery sensor units 100 or 500 and through a network connection provide data collected by the battery sensor units to a database that can be accessed by remote users using an internet accessible portal or mobile app. The system may provide real time alerts for out of bound conditions to allow the prevention of dangerous conditions or maintenance to be indicated prior to potential breakdowns or other issues. For example, where the water level of a cell drops below a predetermined safe level, an alert message can be generated and sent. In another example, the supply voltage to temperature ratios of the cells may be monitored and any cells having ratios following outside a predetermined range may be flagged for maintenance before failure occurs.

In one illustrative example, a system in accordance with the present disclosure may monitor and report voltage for each battery cell, along with other collected data, using the corresponding numbers of BSUs 100 and SMUs 1000 to track the batteries on multiple vehicles (such as forklifts) at a single location (such as a warehouse). Tracked values are entered by the system into a database. Using the mobile app or an internet interface, the current and historical values may be tracked. Where values indicate a battery is in need of charging or is exhibiting signs of reaching the end of its useful life (such as a shortened charge time, or extreme variance in performance between cells), the system may schedule the battery for appropriate action, such as charging maintenance or replacement. Where a condition of concern is detected, such as a cell or battery liquid level dropping past an acceptable point, or a temperature rising above an acceptable point, an alert may be generated that is sent to users using a messaging protocol, such as email SMS, phone notification, or the like. This allows the receiving user to take action that may help avoid damage to a battery, the system, a vehicle or the location.

It will be appreciated that in addition to monitoring a battery, the battery sensor units, and senor modules are not limited to this one area of use. Systems in accordance with the present disclosure can serve as sensor collection systems including sensor collection units for any analog sensors that can output data which can be read as a voltage. The site gateway, server and internet portal may thus be used to collect, process and monitor data, including continuous data collection and monitoring for a wide variety of applications and uses.

While this disclosure has been described using certain embodiments, it can be further modified while keeping within its spirit and scope. This application is therefore intended to cover any variations, uses, or adaptations of the disclosure using its general principles. This application is intended to cover any and all such departures from the present disclosure as come within known or customary practices in the art to which it pertains, and which fall within the limits of the appended claims.

What is claimed is:

1. A system for monitoring battery conditions, the system comprising:
    a site gateway, comprising a gateway processor; and
    at least a first battery sensor unit, the least first battery sensor unit comprising a sensor unit processor, the sensor unit processor configured to monitor an available voltage on every individual cell on a battery continuously in actual use, including as the battery is charged, is drawn down during use and is at rest, the at least first battery sensor unit configured to communicate with the site gateway;
    a server including one or more hardware processors, the server configured to communicate with the site gateway;
    a non-transitory storage medium having stored therein computer-executable instructions which, when executed by the one or more hardware processors:
        receives data collected by the at least first battery sensor unit regarding parameters of individual cells of the battery;
        stores that data regarding the parameters of the individual cells of the battery in a database; and
        indicates that an individual battery cell requires maintenance when the received data collected by the at least first battery sensor unit contains a value outside a predetermined range that is associated with the individual battery cell.

2. The system of claim 1, wherein the at least first battery sensor unit is configured to monitor the available voltage on every individual cell on the battery by direct connection to a positive terminal on each individual cell.

3. The system of claim 1, wherein the at least first battery sensor unit is further configured to monitor a volume of an electrolyte solution in at least one individual cell on the battery by a direct connection to a liquid level sensor in the at least one individual cell.

4. The system of claim 1, wherein the at least first battery sensor unit is further configured to monitor a temperature of an electrolyte solution in at least one individual cell on the battery by a direct connection to a temperature sensor in the at least one individual cell.

5. The system of claim 1, wherein the at least first battery sensor unit is further configured to monitor an amperage of the battery by a direct connection to an amperage sensor in connection with a positive output terminal of the battery.

6. The system of claim 5, wherein the amperage sensor comprises a Hall Effect sensor placed to monitor a cable connected to the positive output terminal of the battery.

7. The system of claim 1, further comprising a plurality of battery sensor units, each battery sensor unit of the plurality of battery sensor units comprising a sensor unit processor configured to monitor an available voltage on every individual cell on a separate battery, each battery sensor unit of the plurality of battery sensor units configured to communicate with the site gateway.

8. The system of claim 1, wherein the non-transitory storage medium further includes computer-executable instructions to allow a user to access data from the database as a visual display.

9. The system of claim 1, wherein the system is configured to provide a real time alert when the at least first battery sensor unit detects a voltage reading indicating an out of bound condition on an individual cell that is associated with a potentially dangerous condition.

10. The system of claim 1, further comprising a plurality of site gateways, each site gateway in communication with the server and in communication with a separate set of battery sensor units such that the system monitors individual cells on batteries on multiple vehicles used at a single facility.

11. A system for monitoring conditions, the system comprising:
    a first site gateway, comprising a gateway processor; and
    at least a first sensor collection unit, the at least first sensor collection unit comprising a sensor unit processor, the sensor unit processor configured to receive multiple discrete data inputs as voltage readings, the at least first sensor collection unit configured to communicate with the first site gateway;
    a server including one or more hardware processors, the server configured to communicate with the first site gateway;

a non-transitory storage medium having stored therein computer-executable instructions which, when executed by the one or more hardware processors:
continuously receives data collected by the at least first sensor processing unit regarding the multiple discrete data inputs; and
stores that data regarding the multiple discrete data inputs in a database, and
schedules required maintenance when the received data collected by the at least first sensor processing unit contains a value outside a predetermined range.

12. The system of claim 11, wherein the at least first sensor collection unit is configured to monitor an available voltage directly from an individual cell on a battery.

13. The system of claim 11, wherein the at least first sensor collection unit is further configured to receive a voltage reading from an analog sensor.

14. The system of claim 13, wherein the analog sensor comprises a thermistor that sends a voltage reading corresponding to a temperature reading to the at least first sensor collection unit.

15. The system of claim 13, wherein the analog sensor comprises an amperage sensor that sends a voltage reading corresponding to an amperage reading to the at least first sensor collection unit.

16. The system of claim 11, further comprising a plurality of sensor collection units, each sensor collection unit of the plurality of sensor collection units comprising a sensor unit processor configured to receive multiple discrete data inputs as voltage readings, each sensor collection unit of the plurality of sensor collection units configured to communicate with the first site gateway.

17. The system of claim 11, wherein the non-transitory storage medium further includes computer-executable instructions to allow a user to access data from the database as a visual display.

18. The system of claim 11, wherein the non-transitory storage medium further includes computer-executable instructions to send a notification to a user when a monitored data input parameter exceeds a set value.

19. The system of claim 11, wherein the system is configured to provide a real time alert when the at least first sensor collection unit detects a voltage reading indicating an out of bound condition that is associated with a potentially dangerous condition.

20. The system of claim 11, further comprising a plurality of site gateways, each site gateway in communication with the server and in communication with a separate set of sensor collection units such that the system monitors individual cells on batteries on multiple vehicles used at a single facility.

* * * * *